United States Patent [19]

Nagumo et al.

[11] Patent Number: 4,782,710
[45] Date of Patent: Nov. 8, 1988

[54] KARMAN VORTEX FLOW METER

[75] Inventors: Mutsumi Nagumo; Masashi Machida; Michihiko Tsuruoka, all of Kanagawa, Japan

[73] Assignee: Fuji Electric Co., Ltd., Kanagawa, Japan

[21] Appl. No.: 43,044

[22] Filed: Apr. 27, 1987

[30] Foreign Application Priority Data

Apr. 30, 1986 [JP] Japan .................................. 61-98364
Jun. 10, 1986 [JP] Japan .................................. 61-134455
Aug. 22, 1986 [JP] Japan .................................. 61-195260

[51] Int. Cl.$^4$ .............................................. G01F 1/32
[52] U.S. Cl. ............................................. 73/861.22
[58] Field of Search ....................... 73/861.22, 861.24

[56] References Cited

U.S. PATENT DOCUMENTS

4,182,165  1/1980  Kita .................................. 73/861.22
4,584,883  4/1986  Miyoshi et al. .................. 73/861.24

Primary Examiner—Herbert Goldstein
Attorney, Agent, or Firm—Finnegan, Henderson, Farabow, Garrett and Dunner

[57] ABSTRACT

A Karman vortex flow meter including an upstream columnar body having a substantially isosceles triangular cross section and a downstream columnar body having a substantially isosceles trapezoidal cross section. The downstream columnar body has a base surface which is substantially equal in width to the base surface of the upstream columnar body. The two bodies are positioned in a stream of a fluid with their base surfaces disposed at a distance from each other in mutually parallel relation and at right angles to the stream for generating Karman vortices to measure the flowing speed or rate of the fluid based on the frequency of the vortices. The upstream columnar body has a pair of rounded edges along its base surface.

6 Claims, 9 Drawing Sheets

PULSATION RATE = $\frac{\Delta V}{2\overline{V}} \times 100\ (\%)$

KARMAN VORTEX FLOW METER

BACKGROUND OF THE INVENTION

1. Field of the Invention

This invention relates to a Karman vortex flow meter for measuring the flow rate of a fluid by detecting the frequency of Karman vortex streets or trains which are regularly produced downstream of a columnar body placed in a stream of the fluid at right angles thereto.

2. Description of the Prior Art

Figure 1:
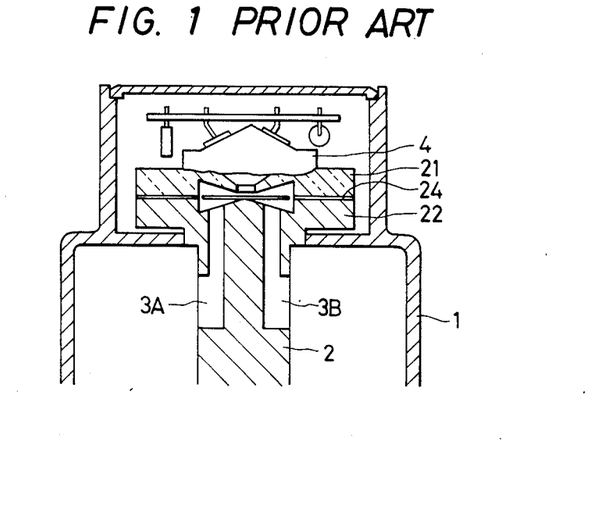
FIG. 1 is a schematic illustration of a conventional Karman vortex flow meter.
Figure 2:
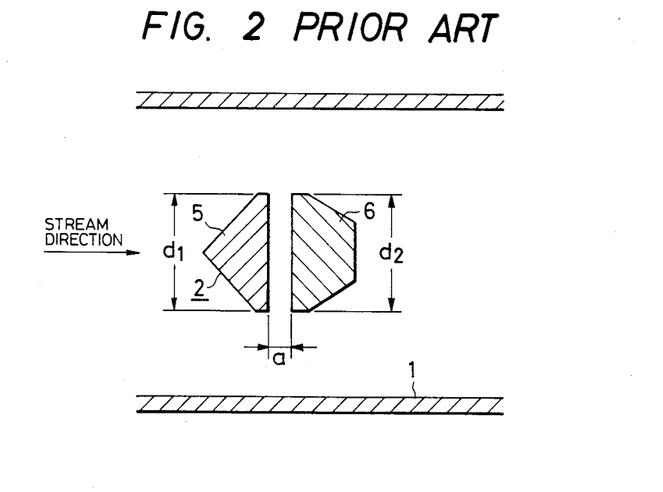
FIG. 2 is a schematic illustration in cross section of the columnar bodies in the flow meter of FIG. 1.

A Karman vortex flow meter of the type which is schematically shown in FIG. 1 is known in the art and is disclosed in, for example, Japanese Laid-Open Patent Application No. 184512/1983. The flow meter comprises a pair of columnar vortex generating bodies 2 in a pipeline 1 and a vortex detecting device 4 associated therewith. The vortex detecting device 4 essentially consists of an upper housing 21, a lower housing 22 and a vibrator 24. The columnar bodies 2 consist of an upstream columnar body 5 having a cross section which is substantially equal to that of an isosceles triangle, and a downstream columnar body 6 having a cross section which is substantially equal to that of an isosceles trapezoid, as shown in FIG. 2. They are placed in a stream of fluid at right angles thereto. The pressure fluctuations of the Karman vortices 23 which are generated around both sides of the columnar bodies 5 and 6 are transmitted to the vortex detecting device 4 through open spaces 3A and 3B. The upstream columnar body 5 has a width or base length $d_1$ which is equal to the width or base length $d_2$ of the downstream columnar body 6. They are spaced apart from each other by a predetermined distance as shown at a, and arranged at right angles to the direction of the fluid stream in the pipeline 1. The columnar bodies 2 provide a flow meter capable of giving results of good linearity over a wide range of measurement without causing any substantial pressure loss of fluid.

Figure 3:
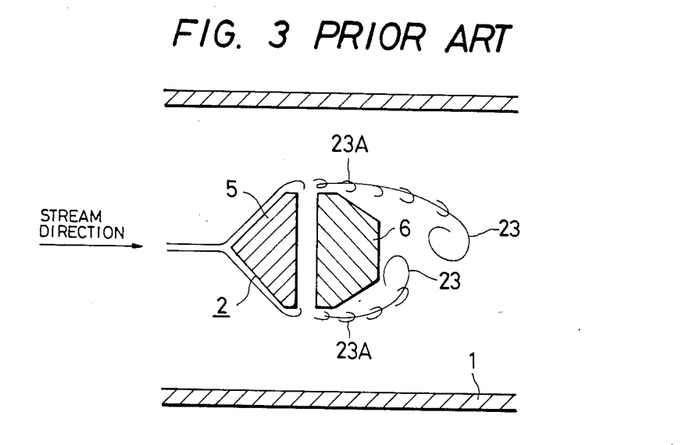
FIG. 3 is a view similar to FIG. 2, but showing the vortices generated around the columnar bodies.

The flow meter as shown in FIGS. 1 and 2 has, however, a serious problem which will now be explained with reference to FIG. 3. The problem occurs in a transitional stage during which a stream of fluid makes a sudden change. It has been found through a visual test that small vortices 23A having a higher frequency are generated from the longitudinal edges of the upstream columnar body 5 in addition to the Karman vortices 23 which are normally generated around the downstream columnar body 6. Due to their high frequency, the vortices 23A grow more rapidly than the Karman vortices 23, especially the fluid has a very widely varying flowing speed due to pulsation. There is every likelihood that the vortices 23A may disturb the Karman vortices 23 and make it difficult to measure the flow rate of the fluid.

SUMMARY OF THE INVENTION

Under these circumstances, it is an object of this invention to provide a Karman vortex flow meter which can effectively overcome the drawbacks of the prior art as hereinabove pointed out and ensure the stability of Karman vortices even during any transitional change in the flowing speed of a fluid due to, for example, pulsation, and which is simple in construction and easy to manufacture.

This object is attained by a flow meter essentially comprising an upstream columnar body having a cross section shaped substantially like an isosceles triangle and a downstream columnar body having a cross section shaped substantially like an isosceles trapezoid, the upstream columnar body having a base surface spaced apart from the downstream columnar body, the downstream columnar body having a base surface spaced apart from the base surface of the upstream columnar body and lying in parallel thereto, the base surfaces of the columnar bodies being substantially of the same width, characterized in that the upstream columnar body has a pair of rounded longitudinal edges each located on the opposite side of its base surface from the other.

The upstream columnar body preferably has a pair of parallel narrow lateral surfaces each located on the opposite side of its base surface from the other and having a rounded corner defining one of its rounded longitudinal edges.

The cross section of the downstream columnar body preferably has a substantially semicircular shape defined by its base surface and an arcuately curved lateral surface. The downstream columnar body preferably has between its base and lateral surfaces a maximum thickness or height which is about 0.3 to 0.6 time as large as the width of its base surface, while its substantially semicircular cross section preferably has a radius which is at maximum 0.75 time as large as the width of its base surface.

Moreover, the downstream columnar body preferably has a pair of isosceles surfaces having an angle of about 60° therebetween.

Other features and advantages of this invention will become apparent from the following detailed description and the accompanying drawings.

DETAILED DESCRIPTION OF THE INVENTION

Figure 4:
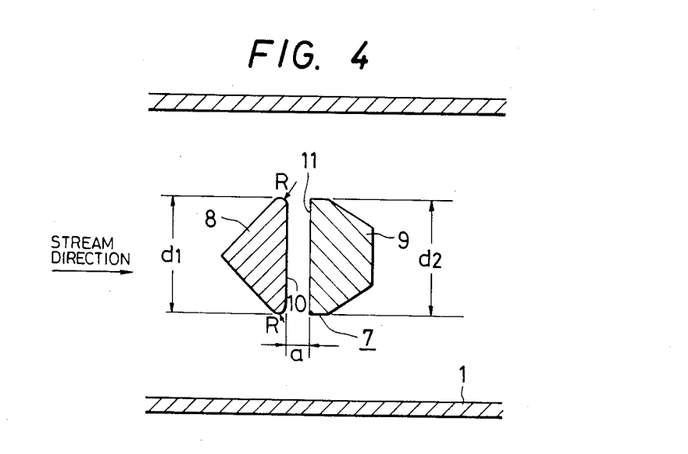
FIG. 4 is a schematic illustration in cross section of a flow meter embodying this invention.
Figure 5:
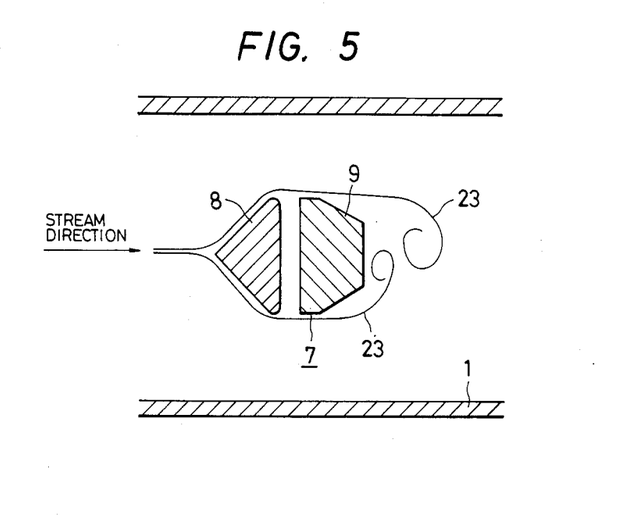
FIG. 5 is a view similar to FIG. 4, but showing the vortices generated around columnar bodies.

The invention will now be described more specifically with reference to a number of embodiments or modifications which are shown in the drawings. Referring first to FIG. 4, a flow meter embodying this invention comprises a columnar body 7 consisting of an upstream columnar body 8 and a downstream columnar body 9. The upstream columnar body 8 has a cross section which is substantially equal to an isosceles triangle. It includes a base surface 10 having a pair of rounded longitudinal edges R. The downstream columnar body 9 has a cross section which is substantially equal to an isosceles trapezoid. The downstream columnar body 9 has a base surface 11 spaced apart from a base surface 10 of the upstream columnar body 8 by an appropriate distance a in parallel relation thereto and having a width $d_2$ which is equal to a width $d_1$ of the base surface 10. The columnar bodies 8 and 9 lie in a stream of a fluid at right angles thereto. They form Karman vortices 23 as shown in FIG. 5, but do not form any such small vortices 23A as shown in FIG. 3.

Figure 6A:
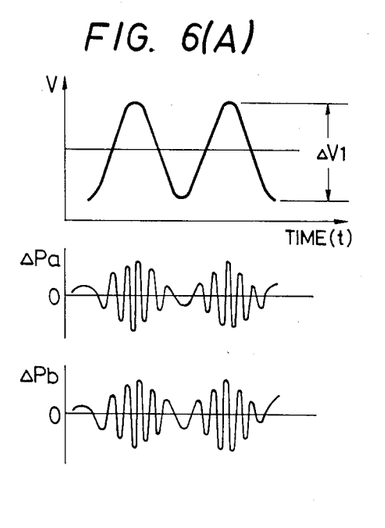
FIGS. 6(A) and 6(B) are graphic representations of the Karman vortices generated in a pulsating stream by the columnar bodies shown in FIG. 5.
Figure 6B:
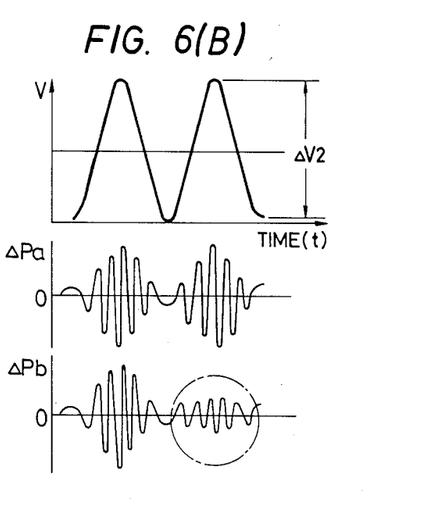

FIGS. 6(A) and 6(B) show the characteristics of the Karman vortices which are produced in a pulsating stream. In FIGS. 6(A) and 6(B), V is the velocity of a fluid pulsating at an amplitude $\Delta V_1$ or $\Delta V_2$, $\Delta Pa$ is the pressure of the fluid created by the Karman vortices which are produced around the columnar body 7 of this invention shown in FIG. 4, and $\Delta Pb$ is the pressure created by the Karman vortices produced around the conventional columnar body 2 shown in FIG. 2. FIG. 6(A) shows the pressures $\Delta Pa$ and $\Delta Pb$ resulting from the pulsation of the fluid at an amplitude $\Delta V_1$ and FIG. 6(B) shows the pressures $\Delta Pa$ and $Pb$ resulting from the pulsation of the fluid at an amplitude $\Delta V_2$ which is greater than $\Delta V_1$. In FIG. 6(A), both of the pressures $\Delta Pa$ and $\Delta Pb$ vary properly in accordance with the amplitude $\Delta V_1$ of pulsation of the fluid. In FIG. 6(B), however, the pressure $\Delta Pb$ fails to vary with the greater amplitude $\Delta V_2$ as shown by a circle in a chain line, while the pressure Pa still follows the amplitude $\Delta V_2$ properly. These results have been obtained experimentally. FIG. 6(B) confirms that the columnar body 7 according to this invention enable the stable generation of Karman vortices even in a fluid pulsating at an increased amplitude.

Figure 7:
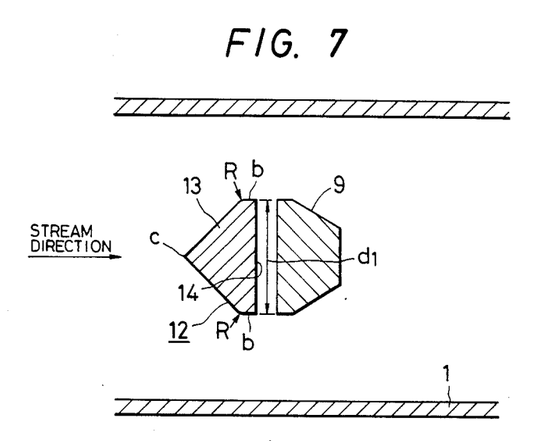
FIG. 7 is a schematic illustration in cross section of a flow meter according to another embodiment of this invention.

Another device embodying this invention is shown in FIG. 7. It includes a columnar body 12 consisting of an upstream columnar body 13 and a downstream columnar body 9 which is identical in construction to that shown in FIG. 4. The upstream columnar body 13 has a pair of narrow lateral surfaces b lying at right angles to its base surface 14 and in parallel to a stream of a fluid and a pair of rounded corners R each formed between one of its narrow lateral surfaces b and one of its isosceles surfaces joining each other at an apex c. The provision of the narrow lateral surfaces b ensures the accurate formation of the base surface 14 having an appropriate width $d_1$ and the stable generation of Karman vortices 23 irrespective of any transitional change in the flowing speed of a fluid due to, for example, pulsation.

Figure 8:
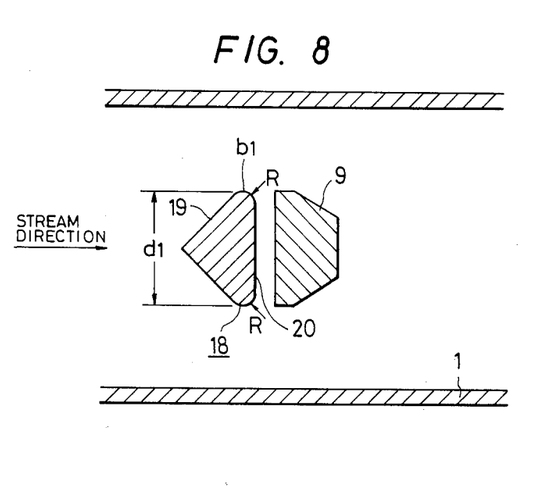
FIG. 8 is a schematic illustration in cross section of a flow meter according to still another embodiment of this invention.

Another device embodying this invention is shown in FIG. 8. It is a modified form of the device shown in FIG. 7. It includes a columnar body 18 consisting of an upstream columnar body 19 and a downstream columnar body 9 which is identical in construction to that shown in FIG. 7. The upstream columnar body 19 has a pair of narrow lateral surfaces $b_1$ lying in parallel to a stream of a fluid and a pair of rounded corners R each formed between one of its narrow lateral surfaces $b_1$ and its base surface 20. The provision of the narrow lateral surfaces $b_1$ ensures the accurate formation of the base surface 20 having an appropriate width $d_1$ and the stable generation of Karman vortices 23.

Figure 9:
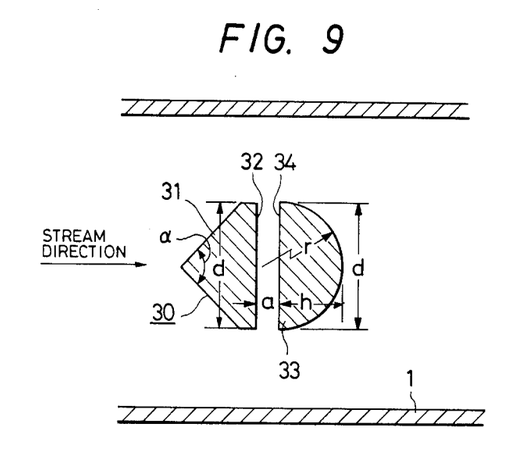
FIG. 9 is a schematic illustration in cross section of a flow meter according to still another embodiment of this invention.

Another embodiment of this invention is shown in FIG. 9. It includes a columnar body 30 consisting of an upstream columnar body 31 and a downstream columnar body 33. The upstream columnar body 31 has a cross section which is substantially equal to an isosceles triangle and the downstream columnar body 33 has a substantially semicircular cross section. The base surfaces 32 and 34 of the upstream and downstream columnar bodies 31 and 33, respectively, are substantially of the same width d, and spaced apart from each other by an appropriate distance a and lie in parallel to each other. They lie at right angles to a stream of a fluid.

The upstream columnar body 31 has a pair of equilateral surfaces and a pair of narrow lateral surfaces each formed between its base surface 32 and one of its equilateral surfaces. The downstream columnar body 33 has an arcuately curved surface. It has been experimentally found that stable von Karman's vortices 23 can be generated without causing any appreciable pressure loss if the equilateral surfaces of the upstream columnar body 31 have an apex angle of about 90° and if the downstream columnar body 33 has a height h which is equal to 0.3 to 0.6d between its base surface 34 and its arcuately curved surface and its arcuately curved surface has a radius r not exceeding 0.75d, while the distance a between the bodies 31 and 33 is about 0.2d to 0.3d.

Figure 11:
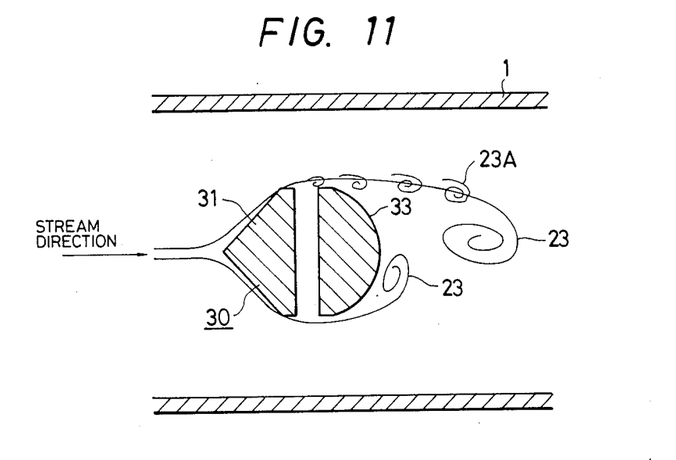
FIG. 11 is a view showing the Karman vortices generated by the columnar bodies in the flow meter of FIG. 9.

The columnar body 30 shown in FIG. 9 are effective for stabilizing the generation of Karman vortices 23 in a transitional state in which a fluid suddenly increases its flowing speed. It has, however, been found through a visual test that the device of FIG. 9 is likely to generate small vortices 23A having a higher frequency from the edge of the base surface 32 of its upstream columnar body 31, in addition to the Karman vortices 23 formed around its downstream columnar body 33, as shown in FIG. 11, when the fluid pulsates and suddenly increases its flowing speed. The vortices 23A prevent the stable generation of Karman vortices 23.

Figure 10:
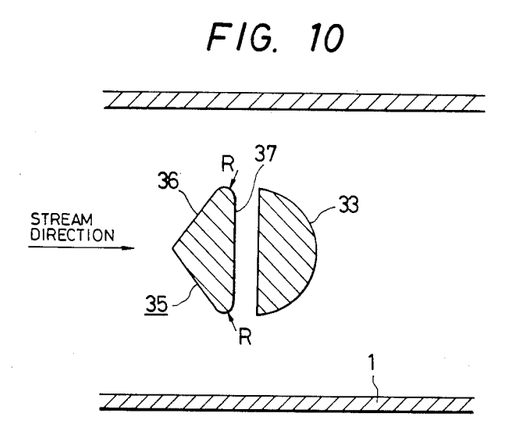
FIG. 10 is a schematic illustration in cross section of a flow meter according to still another embodiment of this invention.
Figure 12:
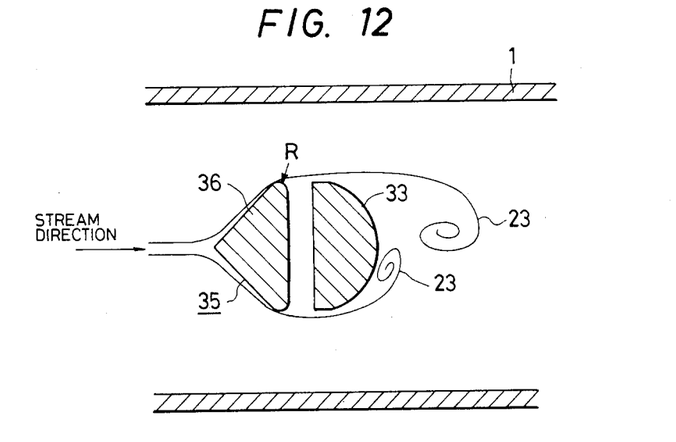
FIG. 12 is a view showing the Karman vortices generated by the columnar bodies in the flow meter of FIG. 10.

Another device embodying this invention is shown in FIG. 10. It is an improvement over the device shown in FIG. 9. It includes an upstream columnar body 36 having a pair of rounded edges R between its base surface 37 and its isosceles surfaces, respectively, while its downstream columnar body 33 is equal in construction to that shown in FIG. 9. The rounded edges R substantially prevents the generation of small vortices 23A to thereby ensure the stable generation of Karman vortices 23, as shown in FIG. 12.

Japanese Patent Publication No. 37511/1979 discloses a device which comprises an upstream columnar body having a trapezoidal cross section and a downstream columnar body having a semicircular cross section. This device has, however, the disadvantage of causing a large loss of fluid pressure. This is due to the fact that the upstream columnar body has a front surface facing a stream of a fluid at right angles thereto. A part of the fluid is forced by the front surface of the upstream columnar body to change its flowing direction and impinge upon the remaining fluid to create a turbulent flow which gives rise to the pressure loss.

On the other hand, the device of this invention ensures the stable generation of vortices without causing any appreciable pressure loss, as its upstream columnar body has a substantially isosceles triangular cross section. It has been found that particularly good results can be obtained, whether a stream of a fluid may have a normal or transitional state, if the isosceles surfaces of the upstream columnar body have an apex angle of about 90° therebetween.

Figure 13:
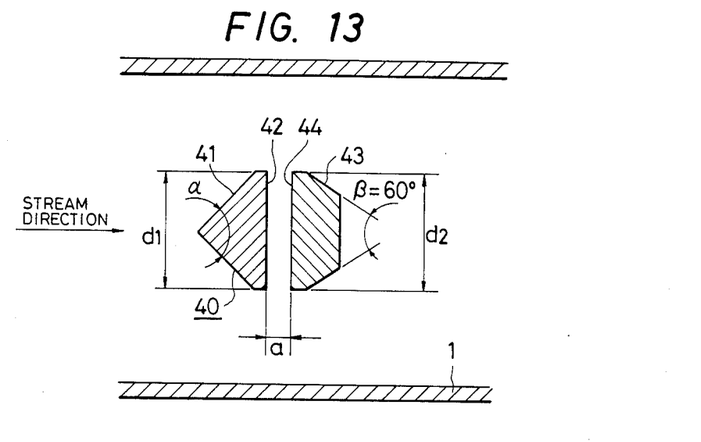
FIG. 13 is a schematic illustration in cross section of a flow meter according to a further embodiment of this invention.

Attention is now directed to FIG. 13 showing still another embodiment of this invention. It is substantially equal in construction to some of the embodiments which have already been described. It includes a columnar body 40 consisting of an upstream columnar body 41 having a substantially isosceles triangular cross section and a downstream columnar body 43 having a substantially isosceles trapezoidal cross section. The base surfaces 42 and 44 of the columnar bodies 41 and 43, respectively, are substantially of the same width as shown at $d_1$ and $d_2$, and spaced apart from each other by an appropriate distance a and lie in parallel to each other at right angles to a stream of a fluid.

Figure 14:
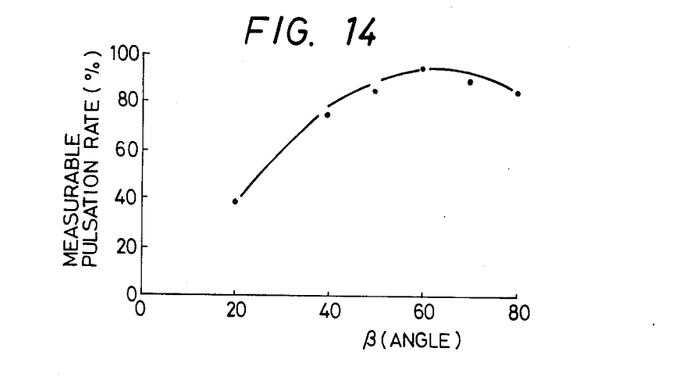
FIG. 14 is a graph showing the rate of pulsation in relation to the angle between the isosceles surfaces of a downstream columnar body in the flow meter of FIG. 13.
Figure 15:
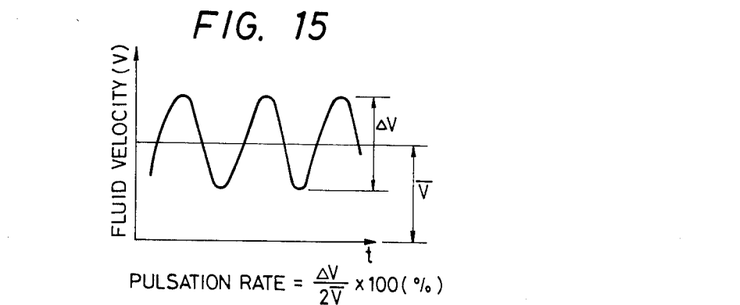
FIG. 15 is a graph explaining the rate of pulsation.

The downstream columnar body 43 has a pair of isosceles surfaces forming an angle of about 60° therebetween. It has been found through a visual test that when a fluid flows at a low rate, the shape of the vortices generated therein and their interference depend on the angle between the isosceles surfaces of the downstream columnar body. A test has, therefore, been conducted to ascertain the rate of pulsation of a fluid at which vortices are satisfactorily produced, in relation to the angle $\beta$. The results are shown in FIG. 14. As is obvious therefrom, the best results have been obtained when the angle is about 60°. The rate of pulsation is based on the relationship between the velocity V of the fluid and the amplitude $\Delta V$ of its pulsation as shown in FIG. 15 and is expressed as $(\Delta V/2\bar{V}) \times 100$ (%), in which $\bar{V}$ is the average velocity of the fluid.

Figure 16:
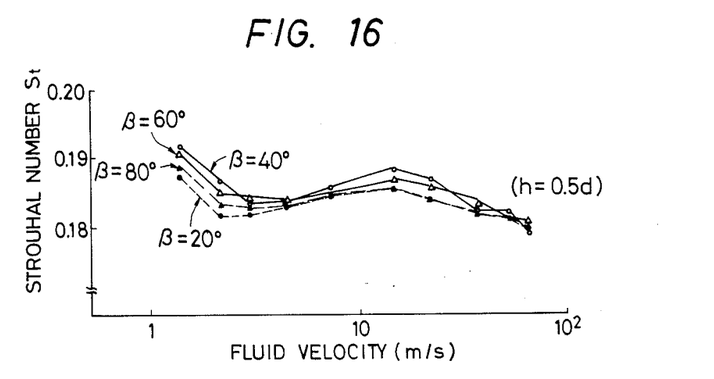
FIG. 16 is a graph showing the relationship between the flowing speed of a fluid and the Strouhal number as obtained when downstream columnar bodies having different angles between their isosceles surfaces are employed.

It has hitherto been considered that the velocity of a fluid and the frequency of the vortices generated therein show a mutual relationship of high linearity over a wide velocity range when the angle $\beta$ does not exceed 40°. However, it has subsequently been found that the linearity of their relationship is less likely to be affected by the angle $\beta$ and can be maintained substantially at the same level as shown in FIG. 16, without having any adverse effect on other characteristics, either, if the angle $\beta$ does not exceed 80° and if the pipeline has an appropriately throttled inlet. The Strouhal number St shown in FIG. 16 is expressed as (the frequency of vortices)×(their typical length)/(velocity of the fluid).

Apart from the optimum angle $\beta$ of about 60°, the following has been found experimentally:

(1) It is possible to generate vortices of the highest stability and detect them at a high SN ratio if the upstream and downstream columnar bodies have substantially the same typical base width ($d_1 = d_2 = d$).

(2) It is possible to generate stable vortices without causing any substantial loss of fluid pressure if the isosceles surfaces of the upstream columnar body have an apex angle $\alpha$ which is not smaller than 90°, and not larger than 120°.

Figure 17:
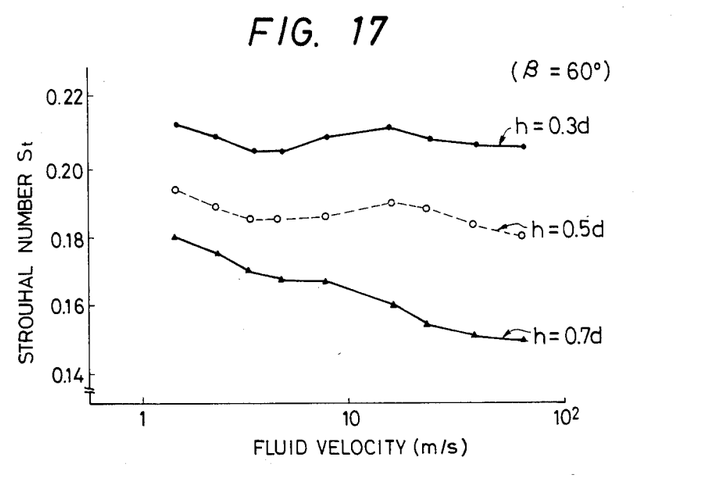
FIG. 17 is a graph showing the relationship between the flowing speed of a fluid and the Strouhal number as obtained when downstream columnar bodies having an angle of 60° between their isosceles surfaces have different trapezoidal heights.

(3) If the downstream columnar body has a trapezoidal height h which is equal to, or smaller than, a half of its base width d, it is possible to generate stable vortices and achieve a relationship of good linearity even when a fluid flows at a low velocity, as shown in FIG. 17.

Figure 18:
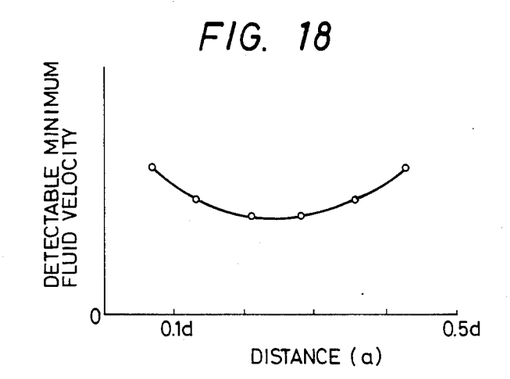
FIG. 18 is a graph showing the minimum flowing speed of a fluid at which vortices can be detected, in relation to the distance between upstream and downstream columnar bodies.
Figure 19:
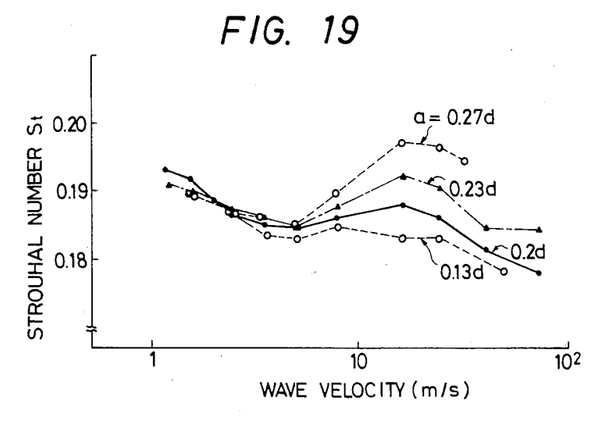
FIG. 19 is a graph showing the relationship between the flowing speed of a fluid and the Strouhal number as obtained when upstream and downstream columnar bodies having different distances therebetween are employed.

(4) It is possible to obtain a wide range of measurement and results of good linearity if the upstream and downstream columnar bodies have a distance a of 0.2d to 0.3d therebetween, as is obvious from FIGS. 18 and 19.

The various embodiments of this invention which have hereinabove been described have a variety of advantages. The rounded edges or corners formed on the upstream columnar body enable the stable generation of Karman vortices even if a fluid may change its flowing speed transitionally due to, for example, pulsation. The downstream columnar body having an angle of about 60° between its isosceles surfaces contributes to the realization of a Karman vortex flow meter which is simple in construction, and yet can generate stable Karman vortices even if a fluid may change its flowing speed transitionally due to, for example, pulsation. Moreover, the downstream columnar body having a substantially semi-circular cross section enables the generation of Karman vortices following a fluid velocity even if a fluid may have a greatly varying velocity, since the vortices which have once been generated leave it so quickly that they do not prevent the growth of the vortices which will thereafter be generated.

What is claimed is:

1. A Karman vortex flow meter for measuring the flow rate of a fluid by detecting the frequency of Karman vortex streets, said flow meter comprising:
   a pipeline for leading the flow of the fluid therein;
   vortex generating means provided in said pipeline for generating Karman vortices around both sides thereof;
   vortex detecting means for detecting the frequency of the Karman vortices generated around said vortex generating means; and
   said vortex generating means comprising an upstream columnar body having a substantially isosceles triangular cross section and a downstream columnar body having a substantially isosceles trapezoidal cross section, said downstream columnar body having a base surface which is substantially equal in width to a base surface of said upstream columnar body, each base surface of said upstream and downstream columnar bodies being spaced apart from the other by a predetermined distance in parallel to the other, said upstream columnar body having a pair of rounded longitudinal edges along the base surface thereof.

2. A Karman vortex flow meter as claimed in claim 1, wherein said upstream columnar body has a pair of narrow lateral surfaces lying along the base surface thereof in parallel to the stream of the fluid and each having a corner defining one of said rounded longitudinal edges.

3. A Karman vortex flow meter for measuring the flow rate of a fluid by detecting the frequency of Karman vortex streets, said flow meter comprising:
 a pipeline for leading the flow of the fluid therein;
 vortex generating means provided in said pipeline for generating Karman vortices around both sides thereof;
 vortex detecting means for detecting the frequency of the Karman vortices generated around said vortex generating means; and
 said vortex generating means comprising an upstream columnar body having a substantially isosceles triangular cross section and a downstream columnar body, said downstream columnar body having a base surface which is substantially equal in width to a base surface of said upstream columnar body and having a cross-section defined by an arcuately curved surface and its base surface, said curved surface forming an arc of a circle, each base surface of said upstream and downsteam columnar bodies being spaced apart from the other by a predetermined distance in parallel to the other and being at right angles to the stream of the fluid.

4. A Karman vortex flow meter as claimed in claim 3, wherein said arcuately curved surface has a radius which is at maximum 0.75 times as large as the width of the base surface thereof, said downstream body having between said base surface and said arcuately curved surface a height which is 0.3 to 0.6 times as large as the width of the base surface thereof.

5. A Karman vortex flow meter as claimed in claim 3 or 4, wherein said upstream columnar body has a pair of rounded longitudinal edges along the base surface thereof.

6. The Karman vortex flow meter of claim 4, wherein said predetermined distance is about 0.2 to 0.3 times the width of said base surface.

* * * * *